(12) United States Patent
Bavaria et al.

(10) Patent No.: US 8,196,143 B2
(45) Date of Patent: Jun. 5, 2012

(54) STORING RESOURCE INFORMATION (75) Inventors: Priti Bavaria, Austin, TX (US); Diane Lacey Knipfer, Rochester, MN (US); Srinivas Kolluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 12/115,317

(22) Filed: May 5, 2008

(65) Prior Publication Data

US 2009/0276786 A1 Nov. 5, 2009

(51) Int. Cl.
*G06F 9/46* (2006.01)
(52) U.S. Cl. ........................................................ 718/104
(58) Field of Classification Search .................. None
See application file for complete search history.

(56) References Cited

U.S. PATENT DOCUMENTS

| | | | |
|---|---|---|---|
| 4,468,738 A | 8/1984 | Hansen et al. | |
| 5,349,674 A * | 9/1994 | Calvert et al. | 709/227 |
| 5,953,515 A | 9/1999 | Coteus et al. | |
| 6,044,411 A * | 3/2000 | Berglund et al. | 710/9 |
| 6,427,176 B1* | 7/2002 | Berglund et al. | 710/8 |
| 6,516,373 B1 | 2/2003 | Talbot et al. | |
| 7,065,599 B2 | 6/2006 | King et al. | |
| 7,103,743 B2 | 9/2006 | Goldschmidt | |
| 7,340,585 B1 | 3/2008 | Ganesan et al. | |
| 7,685,597 B1* | 3/2010 | Czajkowski et al. | 718/100 |
| 7,752,485 B2* | 7/2010 | Bavaria et al. | 714/2 |
| 2003/0158870 A1 | 8/2003 | Goodman | |
| 2004/0078455 A1* | 4/2004 | Eide et al. | 709/223 |
| 2004/0215569 A1* | 10/2004 | Agha et al. | 705/57 |
| 2006/0230306 A1* | 10/2006 | Richards et al. | 714/7 |
| 2007/0011407 A1* | 1/2007 | Kuehl et al. | 711/141 |
| 2008/0005116 A1* | 1/2008 | Uno | 707/9 |
| 2008/0010497 A1* | 1/2008 | Kronlund et al. | 714/6 |
| 2009/0049330 A1* | 2/2009 | Bavaria et al. | 714/3 |

* cited by examiner

*Primary Examiner* — Idriss N Alrobaye
(74) *Attorney, Agent, or Firm* — Yee & Associates, P.C.; Libby Z. Toub (57) ABSTRACT

In an illustrative embodiment, a data processing system for resource data management is provided. The data process system comprises a set of data structures defining resource relationships and locations for a set of resources to form defined resource relationships and defined locations for the set of resources, and a receiver capable of obtaining replaceable unit data and obtaining characterization data for a current resource in the set of resources to form obtained replaceable unit data and obtained characterization data for the current resource, wherein the obtained replaceable unit data is obtained from a secure device and the obtained characterization data is obtained from an unsecure device. The data processing system further comprises a writer capable of merging the obtained replaceable unit data for the current resource with the obtained characterization data for the current resource for each resource of the set of resources to form a set of data files, wherein each data file corresponds to a resource in the set of resources.

7 Claims, 8 Drawing Sheets

STORING RESOURCE INFORMATION

BACKGROUND OF THE INVENTION

1. Field of the Invention

The present invention relates generally to a data processing system and more specifically, to a computer implemented method, an apparatus and a computer program product for resource data management.

2. Description of the Related Art

On several models of computing systems, resources known as field replaceable units (FRU) are present. Field replaceable units may contain components including backplanes, service processors, one or more processors, memory, and input/output devices. Field replaceable units are typically circuit boards, parts or assemblies that may be quickly and easily removed and swapped with replacements. Other examples of field replaceable units range from keyboards and mice to memory modules, processors and mother boards. Each field replaceable unit may have field replaceable unit vital product data (VPD) defining the resource.

Vital product data is a set of resource attributes. Vital product data is descriptive information describing a resource, in the form of a resource identifier, and attributes specific to the type of resource. The descriptive information for a resource may include how other resources plug into the specific resource, and identifies the type of field replaceable unit, the part number, the serial number, as well as descriptive information for product release level and maintenance level. Other resource specific vital product data may include wiring and access information defining how to get to a next attached device. User specific information may also be available such as location of the resource within the system. Vital product data then may be viewed as having two types of data. A first type of data is that which relates to a replaceable unit and may be contained on a secure device. The second type of data is characterization data specific to a resource and may be contained on a unsecure device such as a serial electrically erasable programmable read-only memory (SEEPROM).

In addition, some field replaceable units comprise multiple embedded resources which must be handled on a single resource basis by firmware running on a service processor. For example, a backplane field replaceable unit may have multiple processor modules soldered onto the backplane. Each processor module has one or more processor cores. Each processor module further contains module vital product data which has characterization data unique to the processor module. The vital product data component in the service processor code assigns a unique resource identifier (RID) to each of the processor modules. The vital product data component provides access to the field replaceable unit vital product data for each processor resource identifier and access to the characterization data from the module vital product data for each processor resource identifier.

In one example, a processor field replaceable unit is a processor backplane with multiple processor modules soldered onto the backplane. The processor modules are not readily removed from the backplane. In this example there is a secure device accessible by the vital product data component in the service processor which contains the field replaceable unit vital product data for the field replaceable unit. The secure device is required to contain the field replaceable unit vital product data which identifies the operational characteristics such as the number of processor cores to be used on each processor module and the speed at which the processors are to be run. Each processor module contains a serial electrically erasable programmable read-only memory which contains processor characterization data that is unique to a processor module. The module information is referred to as module vital product data. The vital product data component in the service processor provides access to this module vital product data.

Because the characterization data is customized to a specific processor module, the system firmware requires a unique resource identifier for each processor module. For example, a system model may have a single instance of processor field replaceable unit vital product data and multiple processor resource identifiers associated with the processor field replaceable unit. A problem occurs because each processor module used needs to be reported to the system kernel code with a correct field replaceable unit vital product data correspondence.

In another example system, the structure may become more complicated. In this example, the processor modules are pluggable field replaceable units. There is a backplane field replaceable unit with a serial electrically erasable programmable read-only memory device containing the backplane vital product data and the processor module field replaceable units. The processor modules contain serial electrically erasable programmable read-only memory with the processor characterization data, but the processor modules do not contain any field replaceable unit vital product data. In this example, all processor modules use the same number of processor cores and run at the same speed. A single secure device is plugged into the processor backplane to contain the field replaceable unit vital product data that is common to all processor field replaceable units. While the field replaceable unit information is common, the module information is not. The module vital product data contains a part number and a serial number which uniquely identifies the processor field replaceable unit, which is the processor module in this case. However, the module vital product data does not have a separate secure place to hold the data for the number of processor cores to run or the processor core speed. Therefore, on this example computer system, each processor module represents a unique field replaceable unit and a resource identifier. The problem is how to pass the correct processor field replaceable unit vital product data on to the system kernel for each processor core to be used.

When the vital product data for different field replaceable units is not unique, that is not having a unique serial number within a group of field replaceable units with a common part number, other components such as the system kernel will not be aware of the correct number of field replaceable units in the set of processors. On systems where each processor module is a separate field replaceable unit, each processor field replaceable unit reports unique vital product data. Failure to report the correct field replaceable unit vital product data for each processor resource identifier will impact the ability to initialize a system, the performance and capacity to upgrade on demand capability of the system, and the serviceability of the system.

BRIEF SUMMARY OF THE INVENTION

In an illustrative embodiment, a computer implemented method for resource data management is provided. The computer implemented method determines whether a resource entry in a first data structure for a set of resources is unique in which the resource entry is a current resource, and responsive to a determination that the current resource is unique, identifies a corresponding entry in a second data structure. The computer implemented method further stores a replaceable unit data for the current resource to form a current data file, determines whether the corresponding entry contains a copy indicator, and responsive to a determination that the corresponding entry contains a copy indicator, copies the current data file into a set of data files, wherein each data file represents a resource identified by the copy indicator. The computer implemented method further determines whether the corresponding entry has a modify indicator, and responsive to a determination that the corresponding entry has a modify indicator, updates each data file in the set of data files with a characterization data for a respective resource in the set of data files.

In another illustrative embodiment, a data processing system for resource data management is provided. The data processing system comprises a bus, a memory connected to the bus, wherein the memory comprises computer-executable instructions, a communications adapter connected to the bus, a display adapter connected to the bus, a processor connected to the bus, wherein the processor executes the computer-executable instructions to direct the data processing system to determine whether a resource entry in a first data structure for a set of resources is unique in which the resource entry is a current resource, responsive to a determination that the current resource is unique, identify a corresponding entry in a second data structure, store a replaceable unit data for the current resource to form a current data file, determine whether the corresponding entry contains a copy indicator, and responsive to a determination that the corresponding entry contains a copy indicator, copy the current data file into a set of data files, wherein each data file represents a resource identified by the copy indicator, determine whether the corresponding entry has a modify indicator and responsive to a determination that the corresponding entry has a modify indicator, update each data file in the set of data files with a characterization data for a respective resource in the set of data files.

In yet another illustrative embodiment, a computer program product for resource data management is provided. The computer program product comprises a computer-readable recordable type medium, tangibly embodying computer-executable instructions thereon. The computer-executable instructions comprise computer-executable instructions for determining whether a resource entry in a first data structure for a set of resources is unique in which the resource entry is a current resource, computer-executable instructions responsive to a determination that the current resource is unique, for identifying a corresponding entry in a second data structure, computer-executable instructions for storing a replaceable unit data for the current resource to form a current data file, computer-executable instructions for determining whether the corresponding entry contains a copy indicator, computer-executable instructions responsive to a determination that the corresponding entry contains a copy indicator, for copying the current data file into a set of data files, wherein each data file represents a resource identified by the copy indicator, computer-executable instructions for determining whether the corresponding entry has a modify indicator, computer-executable instructions responsive to a determination that the corresponding entry has a modify indicator, for updating each data file in the set of data files with a characterization data for a respective resource in the set of data files.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
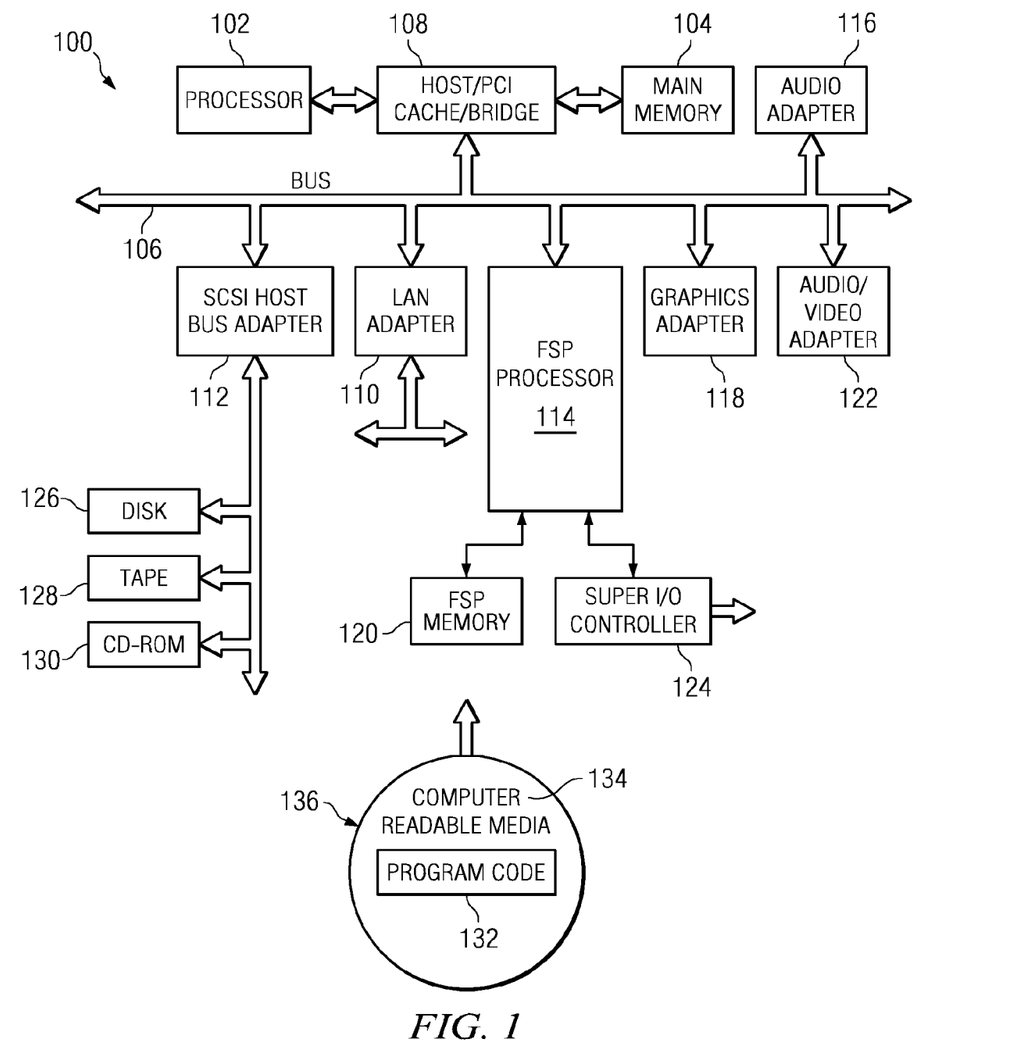
FIG. 1 is a bock diagram of a data processing system including a flexible service processor in accordance with illustrative embodiments.

With reference now to the figures and in particular with reference to FIG. 1, an exemplary diagram of data processing environment is provided in which illustrative embodiments may be implemented. It should be appreciated that FIG. 1 is only exemplary and are not intended to assert or imply any limitation with regard to the environments in which different embodiments may be implemented. Many modifications to the depicted environment may be made.

With reference to FIG. 1, a block diagram of a data processing system, including a flexible service processor, is shown in which illustrative embodiments may be implemented. In this illustrative example, data processing system 100 includes host PCI cache bridge 108, which provides communications between processor 102, and main memory 104. Communications fabric bus 106 connects the host PCI cache bridge 108 with audio adapter 116, SCSI host bus adapter 112, LAN adapter 110, flexible service processor, FSP processor 114, graphics adapter 118 and audio/video adapter 122. A persistent storage in the form of disk 126, tape 128 and CD-ROM 130 are connected through SCSI host bus adapter 112 to bus 106. Communications are provided by LAN adapter 110 in this example but may also be provided by another communication adapter unit for protocol specific access. FSP processor 114 provides connection to FSP memory 120, and Super I/O controller 124. A display device may be attached to graphics adapter 118. The various memory attachments of flexible service processor 114 provide a capability to maintain data for later use by the flexible support processor or made accessible to other components or users.

Processor 102 serves to execute instructions for software that may be loaded into memory 104. Processor 102 may be a set of one or more processors or may be a multi-core processor chip, depending on the particular implementation. Further, processor unit 102 may be implemented using one or more heterogeneous processor systems in which a main processor is present with secondary processors on a single chip. As another illustrative example, processor 102 may be a symmetric multi-processor system containing multiple processors of the same type.

Memory 104 and persistent storage units of disk 126, tape 128, and CD-ROM 130 are examples of storage devices. A storage device is any piece of hardware that is capable of storing information either on a temporary basis and/or a permanent basis. Memory 104, in these examples, may be, for example, a random access memory or any other suitable volatile or non-volatile storage device. Persistent storage may take various forms depending on the particular implementation. For example, persistent storage may contain one or more components or devices. For example, persistent storage may be a hard drive, a flash memory, a rewritable optical disk, a rewritable magnetic tape, or some combination of the above. The media used by persistent storage also may be removable. For example, a removable hard drive may be used for persistent storage.

Communications provided by LAN adapter 110, in these examples, provides for communications with other data processing systems or devices. In these examples, LAN adapter 110 is a network interface card. Communications through LAN adapter 110 may provide communications through the use of either or both physical and wireless communications links.

SCSI host bus adapter 112 allows for input and output of data with other devices that may be connected to data processing system 100. For example, SCSI host bus adapter 112 may provide a connection for persistent storage units of disk 126, tape 128, and CD-ROM 130.

Instructions for the operating system and applications or programs are located on persistent storage, typically from disk 126 or computer-readable media 134. These instructions may be loaded into memory 104 for execution by processor 102 or into FSP memory 120 for execution by flexible service processor 114. The processes of the different embodiments may be performed by processor 102 using computer-executable instructions, which may be located in a memory, such as memory 104 or by flexible service processor 114 using computer-executable instructions which may be located in FSP memory 120. These instructions are referred to as program code, computer-usable program code, or computer-readable program code that may be read and executed by a processor in processor unit 102 or flexible service processor 114. The program code in the different embodiments may be embodied on different physical or tangible computer-readable media, such as memory 104 or persistent storage of disk 126.

Program code 132 is located in a functional form on computer-readable media 134 that is selectively removable and may be loaded onto or transferred to data processing system 100 for execution by processor 102 or flexible service processor 114. Program code 132 and computer-readable media 134 form computer program product 136 in these examples.

In one example, computer-readable media 134 may be in a tangible form, such as, for example, an optical or magnetic disc that is inserted or placed into a drive or other device that is part of persistent storage for transfer onto a storage device, such as a disk 126 that is part of persistent storage. In a tangible form, computer-readable media 134 also may take the form of a persistent storage, such as a hard drive, a thumb drive, or a flash memory that is connected to data processing system 100. The tangible form of computer-readable media 134 is also referred to as computer recordable storage media. In some instances, computer recordable media 134 may not be removable.

Alternatively, program code 132 may be transferred to data processing system 100 from computer-readable media 134 through a communications link to LAN adapter 110 and/or through a connection to super I/O controller 124. The communications link and/or the connection may be physical or wireless in the illustrative examples. The computer-readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. As one example, a storage device in data processing system 100 is any hardware apparatus that may store data. Memory 104, persistent storage such as disk 126, and computer-readable media 134 are examples of storage devices in a tangible form.

In another example, a bus system may be used to implement communications fabric, bus 106 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 104 or a cache such as found in an interface and memory controller hub that may be present in communications fabric 106.

In an illustrative embodiment, using the example of system 100 of FIG. 1, a system may have the vital product data information moved from an embedded location within hardware components, to a storage location in tables in flexible service processor (FSP) memory 120 on a flexible support processor, flexible service processor 114. The vital product data in tables may then be used to provide vital product data collection more effectively from components sharing common information while merging unique data characterizing components as required. The collected and merged data may then more accurately reflect the hardware environment to users of the hardware information. Resource identifiers are assigned to each resource within a system and are used to cross reference between each of the tables.

Flags in the vital product data tables called hardware address tables, module tables and resource location code arrays will instruct the vital product data firmware to collect the vital product data from identified secure devices known as "smart-chips" and from serially electrically erasable programmable read-only memory chips (SEEPROMs). After collecting the information from the hardware a soft copy, in the form a data file, will be created of this vital product data for all resource identifiers which are using the secure device and serial electrically erasable programmable read-only memory vital product data. Only the soft copies of the data are stored on the flexible service processor persistent cache of FSP memory 120 and reported to the external users. For example, in a four processor subsystem, using this methodology, the common vital product data, collected from the single secure device of the four processors, along with the characterization data unique to each processor module, is represented in the tables correctly to now indicate there are four processor resource identifiers in the processor subsystem.

Figure 2:
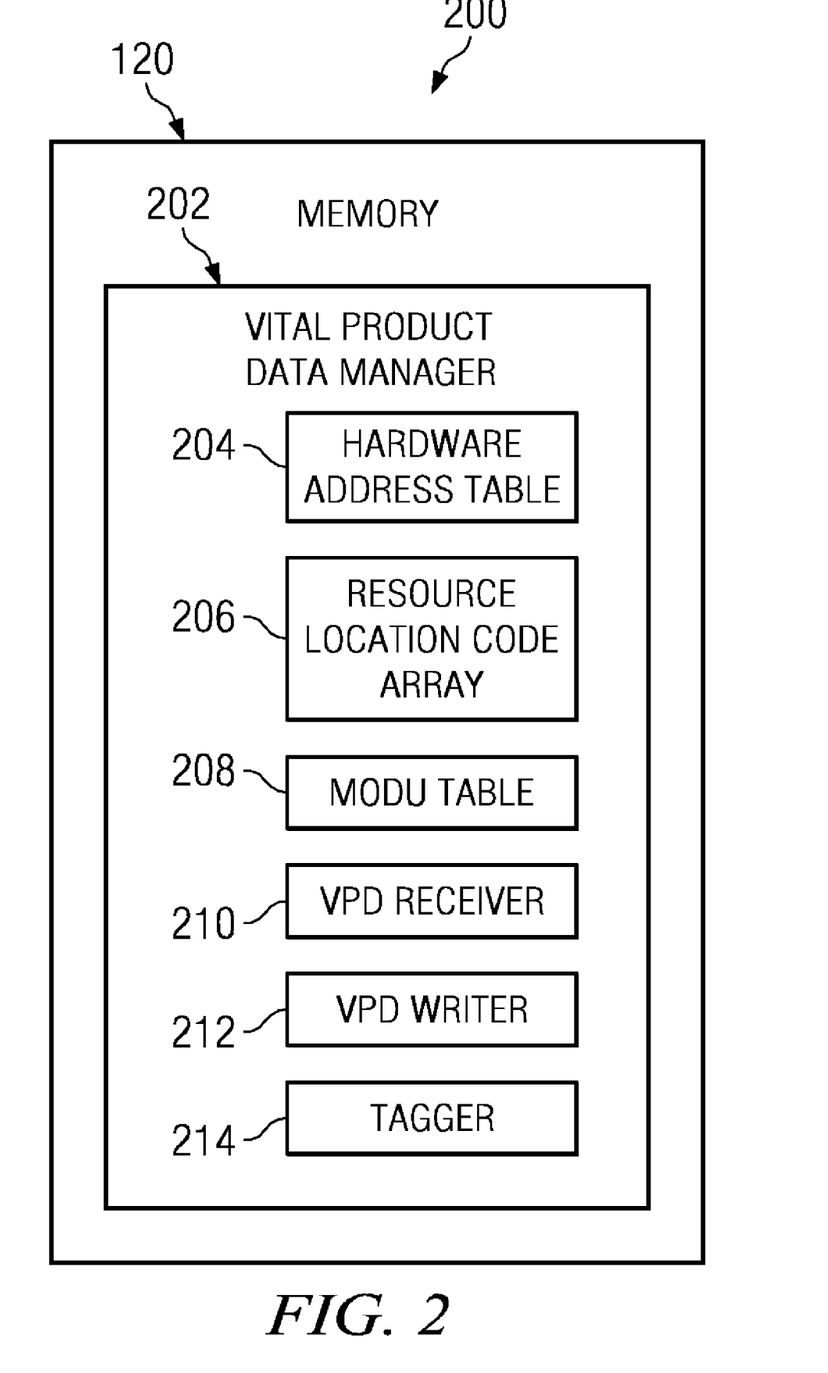
FIG. 2 is a block diagram of components of a vital product data manager, in accordance with illustrative embodiments.

With reference to FIG. 2, a block diagram of components of a vital product data manager, in accordance with illustrative embodiments is shown. In an example of vital product data management 200, vital product data manager 202 is shown within flexible service processor (FSP) memory 120 of flexible service processor 114 of FIG. 1.

A set of data structures are provided, in one example a set of tables, in the form of a first, second and third tables respectively. The set of tables, in the example, comprises a hardware vital product data address tables (HVAT) 204 contained within vital product data manager 202 as are a set of resource location code arrays (RLCA) 206 and a set of module tables (MODU) 208. Information contained in the sets of tables and arrays contain data used to drive the collection and processing of vital product data and characterization data for resources of the data processing system. Each of the data structures implemented as a set of tables in the example may be implemented as described or combined into a single table, list, linked list, array, file, module or other form suitable for containing the described information.

Vital product data receiver 210 works in combination with vital product data writer 212 to collect vital product data from secure vital product data devices, and unsecure serial electrically erasable programmable read-only memory type devices, on the component hardware and store the information as electronic data files. Each includes logic capability as well as context awareness to determine a next entry in a table or to merge a portion of a data with an existent portion of data as in a copy overwrite operation.

Hardware vital product data address table 204 provides information specific to a resource entry indicating the location of a secure device containing vital product data for the current resource. In addition, flags may be found within an entry directing the processing of the entry. For example, the resource entry may indicate by a flag that the entry should copy the vital product data into a set of other resource specific files and that an entry received from a secure device is to be modified by later obtained data.

Resource location code array 206 is a data structure representing each resource of the system. The data structure typically represents the parent and child relationships in the form of a hierarchy. Each resource has an entry in the array. An entry in the resource location code array also provides an indication as to whether the resource includes a vital product data chip.

A module table 208 contains a set of entries of resource path statements. Each path statement leads to an unsecure device containing vital product data in the form of characterization data. For example a "modu entry" would have a resource identifier portion identifying a specific resource and an associated device path used to locate the serial electrically erasable programmable read-only memory device containing characterization data of the specific device. When module vital product data is required, the module table 208 provides the path information need to obtain the respective information.

The tables just described are separate but related in that processing of vital product data may require information from all three tables to complete processing for an entry in the resource location code array table 206. Although shown as separate tables the information can be logically or physically combined as an alternative and still provide the function and content needed.

Tagger 214 adds tags providing processing directives to the information in the previously mentioned sets of tables and arrays where and when needed. For example, the tags provide information indicating use of a data collection template or instruction to copy or modify data depending upon processor support context and requirements.

Figure 3:
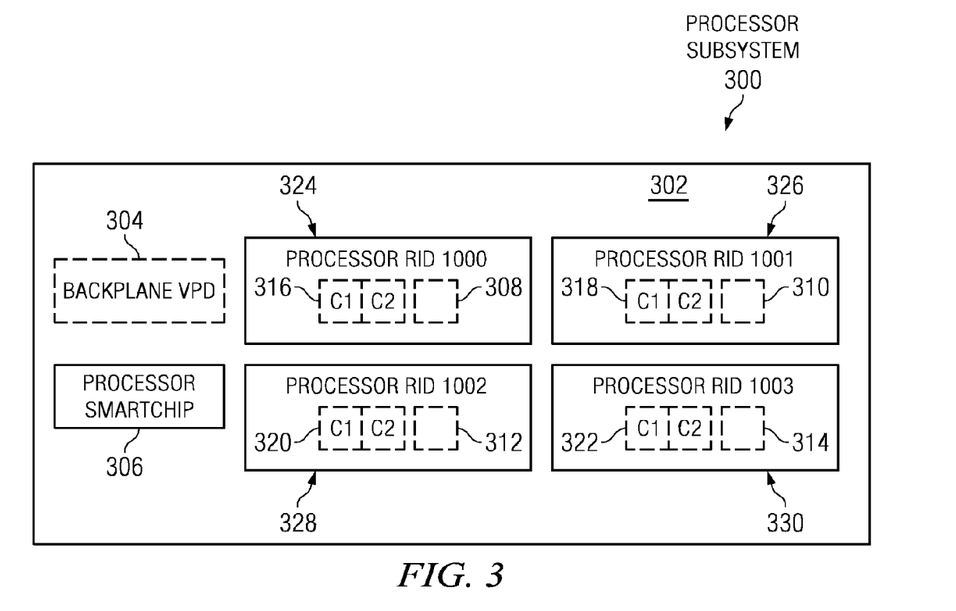
FIG. 3 is a block diagram of a hardware environment of a processor subsystem, in accordance with illustrative embodiments.

With reference to FIG. 3, a block diagram of a hardware environment of a processor subsystem, in accordance with illustrative embodiments is shown. Processor subsystem 300 includes a number of processors forming a set of processors and a processor backplane 302. Processor backplane 302 contains backplane vital product data 304 on a SEEPROM, and processor vital product data for the processor pluggable processor module on a secure "smart-chip" device 306. The "smart-chip" is a secure device, used to contain vital product data for each of the four processor modules shown. The solid lines represent field replaceable units that are pluggable. Dash lines represent resources within field replaceable units that are not pluggable and thus may not be replaced at the specific component level. For example, backplane vital product data 304 is a dashed line indicating replacement only as part of the larger backplane 302 unit. Processor RID 1000 324 is shown with a solid line, representing a field replaceable unit that may be replaced as a component independent of backplane 302.

Four processor modules are represented by processor resource identifier 1000 324, processor resource identifier 1001 326, processor resource identifier 1002 328, and processor resource identifier 1003 330. Each of the processor resources has an associated vital product data in the form of vital product data 308-314. In addition, each processor module resource, in the set of processors, may comprise one or more processor cores as in processor core 316 having cores C1 and C2. Each processor resource 324-330 has core entries of 316-322 respectively.

In an illustrative embodiment, a system may have the vital product data access information moved from embedded within hardware to a storage location in tables on a flexible support processor. These tables define various information including device paths to access field replaceable unit vital product data, module vital product data, light emitting diodes (LEDs), as well as information for location codes, and presence detect. Using the data tables provides a capability to address the previously stated issues.

The flags in the vital product data tables of hardware access tables, module tables, and resource identifier location code arrays will instruct the vital product data firmware to collect the vital product data from one secure device first. After collecting the information from the hardware, a soft copy, in the form a data file, will be created of this vital product data for all resource identifiers which are using the single secure device vital product data. Only the soft copies of the data are stored on the flexible service processor persistent cache and reported to the external users.

Using this methodology the processor vital product data collected from one device for a four processor subsystem, is then correctly represented to indicate there are four processor resource identifiers which are four unique field replaceable units in the system. In addition to making the copies of the processor field replaceable unit vital product data read from the secure device, each of these copies is customized using data from the module vital product data to create unique field replaceable unit vital product data for each of the processor field replaceable unit resource identifiers on the system. The customization is performed by obtaining the part number and serial number for the field replaceable unit from the module vital product data and updating these values in the appropriate copy of the processor field replaceable unit vital product data read from the secure device. In a system configuration comprised of multiple processor backplanes, wherein each backplane has four processors, the above-mentioned process is repeated for each of the backplanes.

Figure 4:
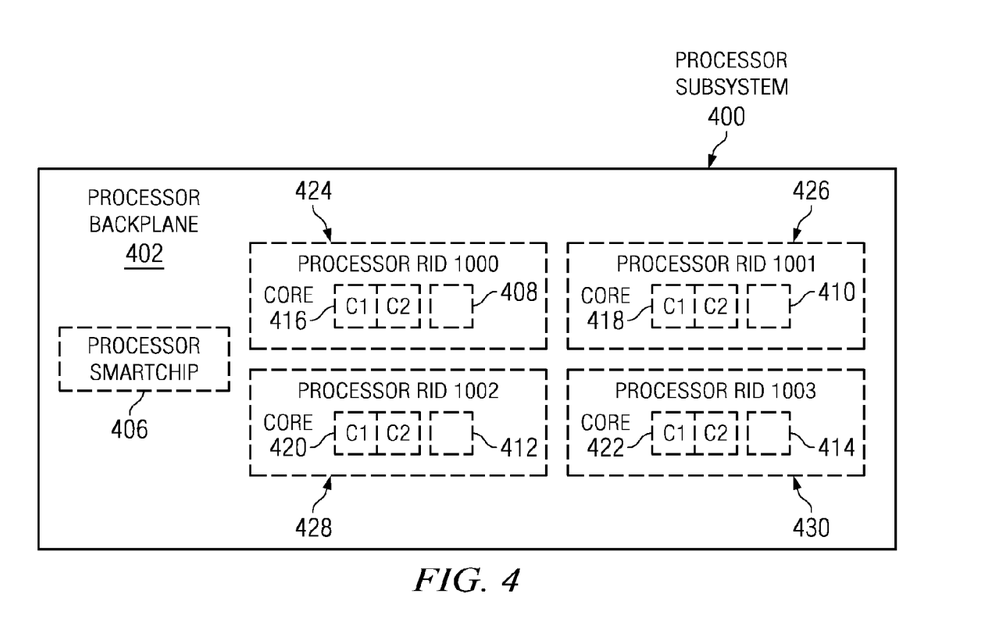
FIG. 4 is a block diagram of a hardware environment of a processor subsystem, in accordance with illustrative embodiments.

With reference to FIG. 4, a block diagram of a hardware environment of a processor subsystem, in accordance with illustrative embodiments is shown. Processor subsystem 400 includes a number of hardwired processors and a processor backplane 402. Processor backplane 402 contains processor vital product data on "smart-chip" 406, which is the field replaceable unit vital product data. The "smart-chip" 406 is a secure device, used to contain vital product data from each of the four processor modules shown. There is no entry for backplane vital product data 304 as in FIG. 3. Each of the processor resources 424-430 is represented by a dashed line. Dashed lines represent resources that are not pluggable and thus, may not be replaced at the specific component level. For example, processor "smart-chip" 406 is represented using a dashed line indicating replacement only as part of the larger backplane 402 unit. Processor RID 1000 424 is shown with a dashed line, representing a resource that may be replaced with the backplane 402.

Four processor modules are represented by processor resource identifier 1000 424, processor resource identifier 1001 426, processor resource identifier 1002 428, and processor resource identifier 1003 430. Each of the processor resources has an associated vital product data in the form of vital product data 408-414. In addition, each processor resource may comprise one or more processor cores as in processor core 416 having cores C1 and C2. Each processor resource 424-430 has core entries of 416-422 respectively.

Figure 5:
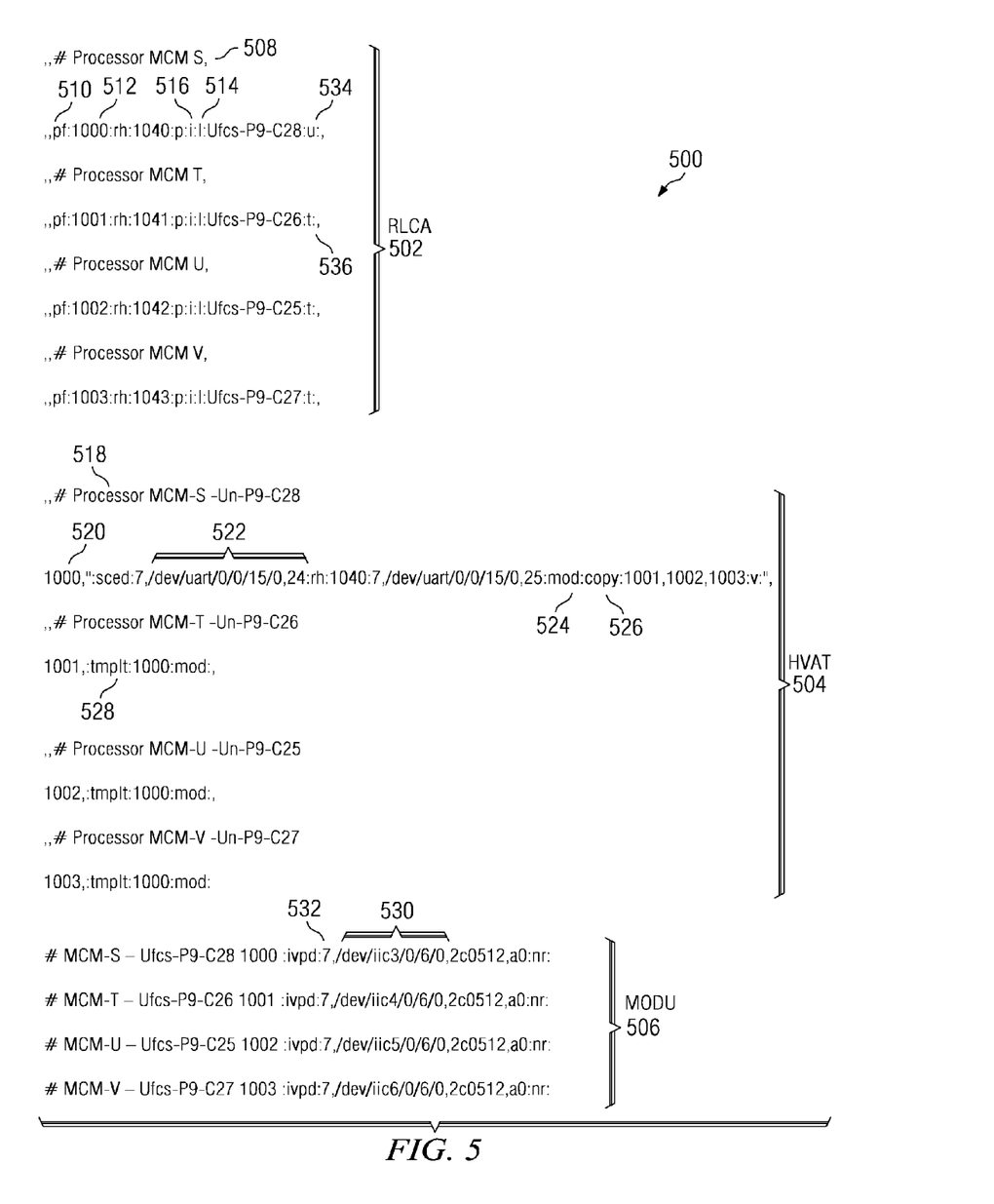
FIG. 5 is a textual representation of data tables and arrays is shown in accordance with illustrative embodiments.

With reference to FIG. 5, a textual representation of data tables and arrays is shown in accordance with illustrative embodiments. The data tables and arrays 500 depicts a sample of entries of three sets of tables and arrays. The first set of data tables is RLCA 502 representing the set of resource location arrays. The second entry, HVAT 504, represents the hardware vital product address tables, and MODU 506 represents the module vital product data address tables.

RLCA 502 identifies types of resources and information. For example, element 508 signifies this entry is for a processor resource. The "pf" tag entry 510 indicates the entry is a processor field replaceable unit type. Entry 512 indicates the resource identifier number "1000." The entry 514, using a "1" tag, indicates that location information follows the tag. Entry 516, using an "i" tag, indicates the information is passed to the operating system. Entry 534 is a "u" tag indicating a unique vital product data exists for this resource. Entry 536 is a "t" tag indicating vital product data used for this resource identifier is a template from a sibling of this field replaceable unit type. To determine which sibling provides the data, traverse the resource location code array backward from the entry having the "t" tag to a first entry encountered with a "u" tag.

HVAT 504 comprises a number of entries describing the addressing information needed to access the hardware when collecting and updating information regarding the field replaceable unit vital product data. Entry 518 indicates this is a processor resource entry. Entry 520 represents the resource identifier number, in this case "1000." Entry 522 indicates the hardware device path to the "smart-chip" secure device for the resource.

New tags are introduced to direct the collection and processing of data. Entry 524 is a "mod" flag indicating a modify operation is performed. Original data collected from the vital product data will be modified with additional data collected for this resource. Original data is copied from the device identified in the path defined earlier, according to entry 526 identifying a "copy" flag. Data is copied to create information for resource identifiers 1001-1003. Entry 528 is a "tmplt" flag indicating a template from resource 1000 is to be used when data is copied into the resource data file. When the copy operation completes, the data is modified as well using part number and serial number data from the characterization information for resource 1001.

MODU 506 provides path information to the serial electrically erasable programmable read-only memory device for the module vital product data. This module vital product data is characterization information unique to the specific processor module and typically includes the part number and serial number of the resource. For example, entry 530 identifies a path of "/dev/iic3/0/6/0" is to be used to access the serial electrically erasable programmable read-only memory containing the module characterization information for processor subsystem "7" identified in entry 532.

Figure 6:
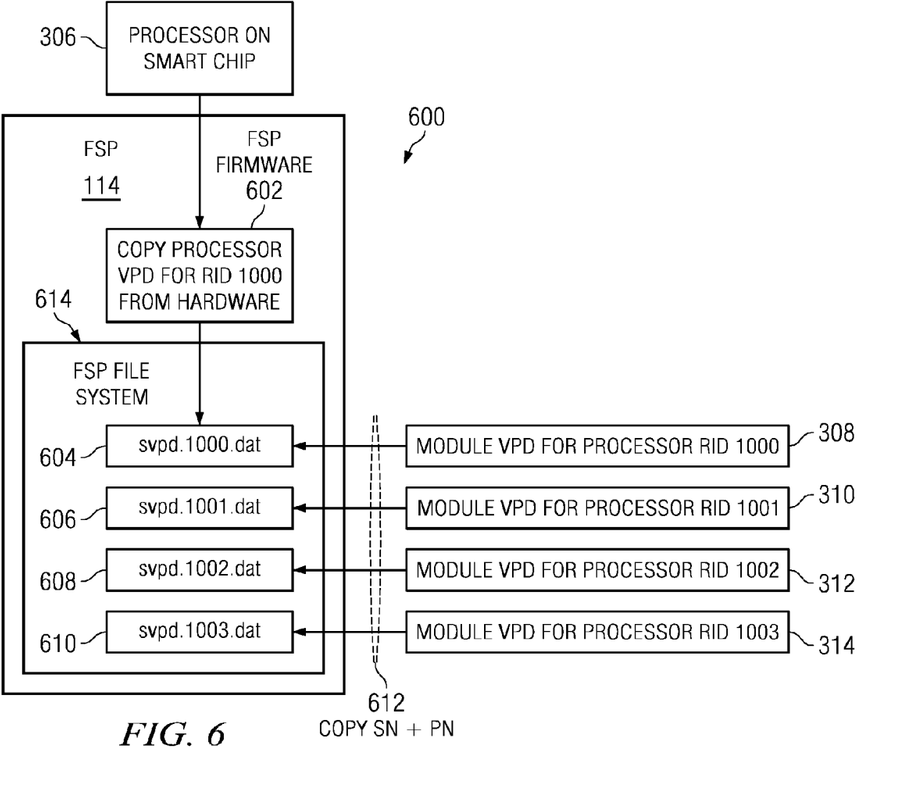
FIG. 6 is a block diagram of data table and vital product data relationships, in accordance with illustrative embodiments.

With reference to FIG. 6, a block diagram of data table and vital product data relationships, in accordance with illustrative embodiments is shown. In the example, vital product data relationship 600 contains four processors and a single "smart-chip" secure device. The four processors are represented by processor RID 1000 308, processor RID 1001 310, processor RID 1002 312, and processor RID 1003 314 of FIG. 3.

The vital product data tables called hardware vital product data address table (HVAT) 204, resource identifier location code arrays (RLCA) 206 and module table 208 of FIG. 2 act as control files to ensure correct processing of the collected data. The control file of the hardware vital product data address table is modified to include use of special descriptive flags. The descriptive flag types, as inserted by tagger 214 of FIG. 2 in one example, comprise a ":copy:" to designate a copy, a ":tmplt:" designating a template and a ":mod:" designating a modify. For the first occurrence of the processor resource identifiers on a processor field replaceable unit having a single node or processor backplane for a multi node system, the hardware vital product data address table entries will contain the device path to the "smart-chip" secure device. This information is represented by processor "smart-chip" 306. Following the first flag type of a ":copy:" designator, in an entry in the table, is a list of resource identifier numbers which are to receive a copy of the template information read from the "smart-chip" device. The copy operation 612 is represented by copy processor vital product data for resource identifier 1000 from hardware of flexible support processor firmware 602. The copy operation uses the vital product data (VPD) receiver 210 and vital product data (VPD) writer 212 of FIG. 2, retrieves the processor serial number and part number for a respective processor module from the module characterization information, and updates the corresponding entry from the "smart-chip" secure device.

The subsequent processor resource identifiers which are to use the same "smart-chip" device data as the template for the respective vital product data will have a special hardware vital product data address table entry of a second flag type":tmplt:" that points back to the resource identifier that has the "smart-chip" secure device path. Flexible service processor firmware will read the "smart-chip" secure device vital product data once and use the data obtained to create a set of data files. In this example, all four of the "svpd.<RID#>.dat" data files. In the example, a naming convention of "svpd" represents the system vital product data, "<RID#>" represents the processor resource identifier number, and ".dat" represents a data file extension type. The result is then shown as data files "svpd.1000.dat" 604, "svpd.1001.dat" 606, "svpd.1002.dat" 608, and "svpd.1003.dat" 610. The data files are stored within the flexible service processor (FSP) file system 614.

In the system example where each of the processor resource identifiers represents a field replaceable unit, a third flag type ":mod:" is added to the hardware vital product data address table entry to indicate that the vital product data code needs to retrieve the field replaceable unit part number and serial number values from the processor module vital product data. The retrieved data replaces the corresponding values in the part number and serial number fields in the data previously read from the "smart-chip" to create the field replaceable units vital product data which is stored in the "svpd.<RID #>.dat" data files.

The first entry in the hardware vital product data address table for processor 1000 includes a source device path address "sced:7,/dev/uart/0/0/15/0,24:rh:1040" to the secure device or "smart-chip" in which the vital product data is stored. The entry also includes the use of the two flags ":mod:copy:" indicating information is to be copied and the serial number and part number of the specific processor is to replace the copied data from the secure device. The same method without the flag indicating ":mod:" is used for platforms where there are multiple processor modules on a single processor field replaceable unit. For example, on a system where there is a single processor field replaceable unit, there is one "smart-chip" secure device and the data read from the secure device is to be used as a template for the vital product data for all sixteen processor modules soldered on the processor field replaceable unit having sixteen resource identifiers.

Figure 7:
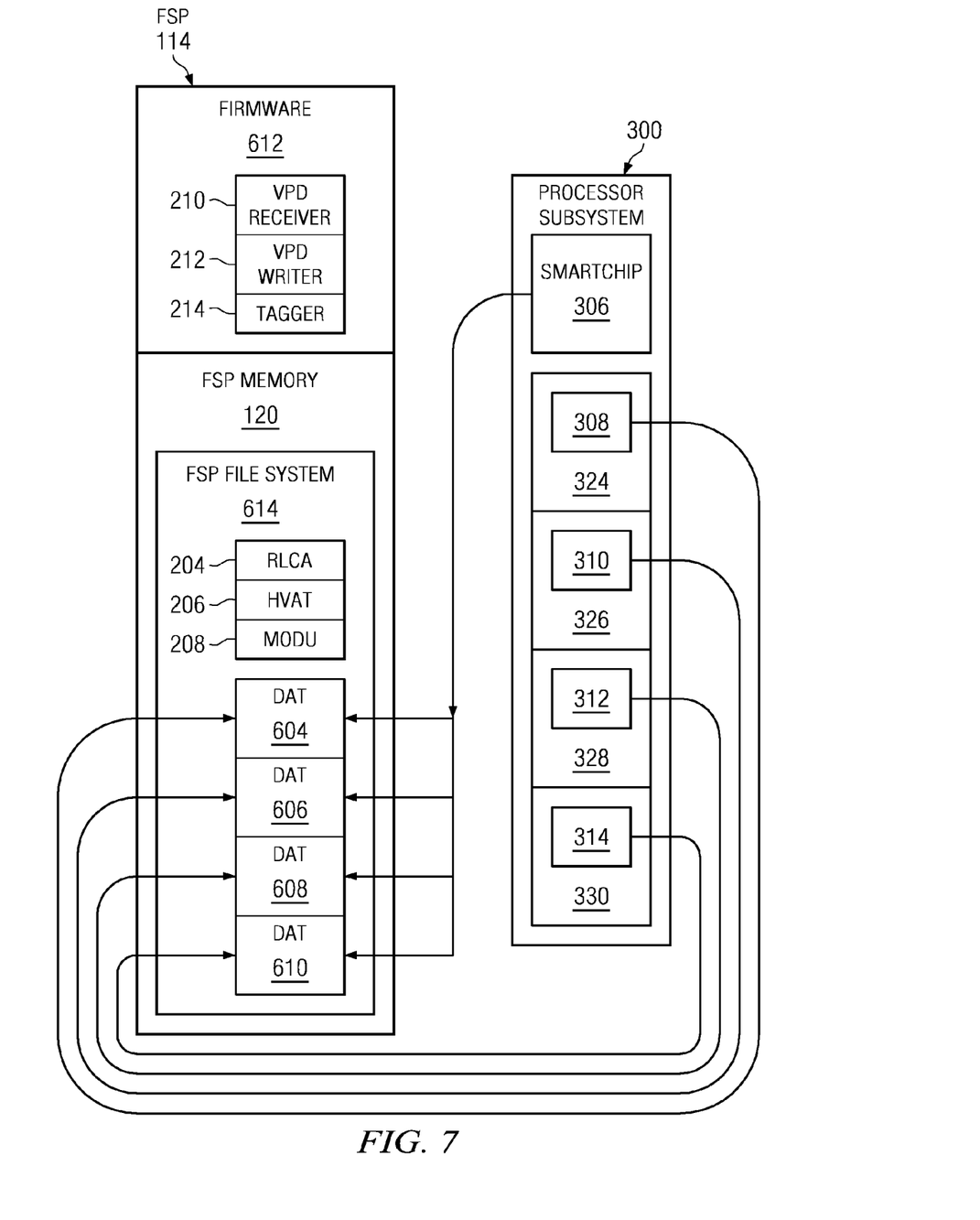
FIG. 7 is a block diagram of a vital data product manager and processor subsystem in accordance with illustrative embodiments.

With reference to FIG. 7 a block diagram of a vital data product manager and processor subsystem in accordance with illustrative embodiments is shown. FIG. 7 provides an overview of the data management interaction between the hardware elements of the flexible service processor 114 and the processor subsystem 300. Components of flexible service processor 114 interact with data elements of processor subsystem 400 to extract both types of vital product data for placement in the memory 120 as data files for use by other component of the system, such as the operating system itself.

Flexible service processor 114 and memory 120 of FIG. 1 is now shown with flexible service processor (FSP) firmware 612 and flexible service processor (FSP) file system 614 components of FIG. 6. In addition firmware 612 includes components of VPD receiver 210, VPD writer 212 and tagger 214 of FIG. 2. Flexible service processor (FSP) file system 614 further includes components of dat files 604-610 of FIG. 6. Memory 120 also includes the tables of RLCA 204, HVAT 206 and MODU 208 of FIG. 2.

Using the example configuration of FIG. 7, a first table, RLCA 204, is read by firmware 612 to determine a resource. A current resource is identified and a corresponding entry for the resource is located in a second table, HVAT 206. A path statement indicating secure device "smart-chip" 306 is found. When a current resource entry in HVAT 206 indicates both a "copy" and a "mod" flag, common data from a secure device is to be merged with additional resource specific data from unsecured devices of the respective resources. Replaceable unit data from the referenced "smart-chip" 306 secure device and characterization from the unsecured resource specific devices, serial electrically erasable programmable read-only memories 408-414 are combined to produce an updated "dat" file for each resource.

VPD receiver 210 obtains the vital product data for the field replaceable unit that comprises processor subsystem 300. Data obtained from "smart-chip" 306 is copied into a "dat" file dat 604 by VPD writer 212. The "copy" flag in the current resource entry in HVAT 206 indicates the "smart-chip" data is to "seed" the "dat" 606-610 files as well. At this stage, each of the "dat" files has the same common data.

The "mod" flag directs vital product data manager 202 components to continue processing data for components of processor subsystem 300. For each resource identified in the copy list of the copy" flag, an entry in the third table, MODU 208 table, is found. The modu entry found provides the path to the unsecure device containing characterization data for the resource. VPD receiver 210 gets the vital product data in the form of characterization data for each resource identified. VPD writer 212 updates each respective "dat" file with the respective resource characterization data. For example, characterization data typically includes a part number and serial number value uniquely identifying the resource.

The data flow may be seen from "smart-chip" 306 into each of "dat" files 604-610. The single line indicates common data of the secure device is shared across the data files. A corresponding flow occurs from each unsecure device 308-314 containing characterization data for each processor resource 324-330 of processor subsystem 300. Here, the multiple separate lines indicate resource specific data is added to the data files from the processor resource entries.

Figure 8A:
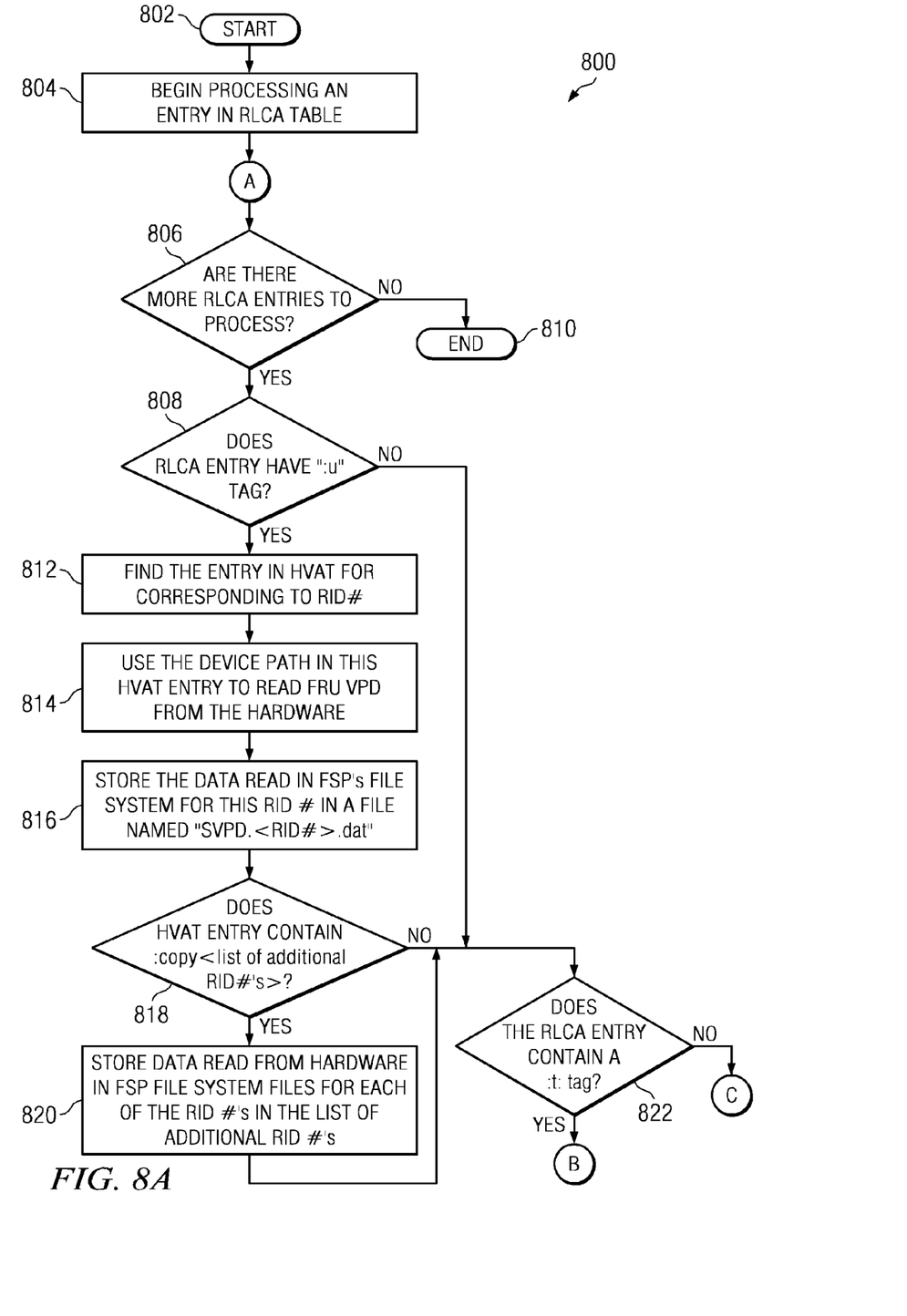
FIGS. 8A and 8B are flowcharts of a process of vital product data management, in accordance with illustrative embodiments.
Figure 8B:
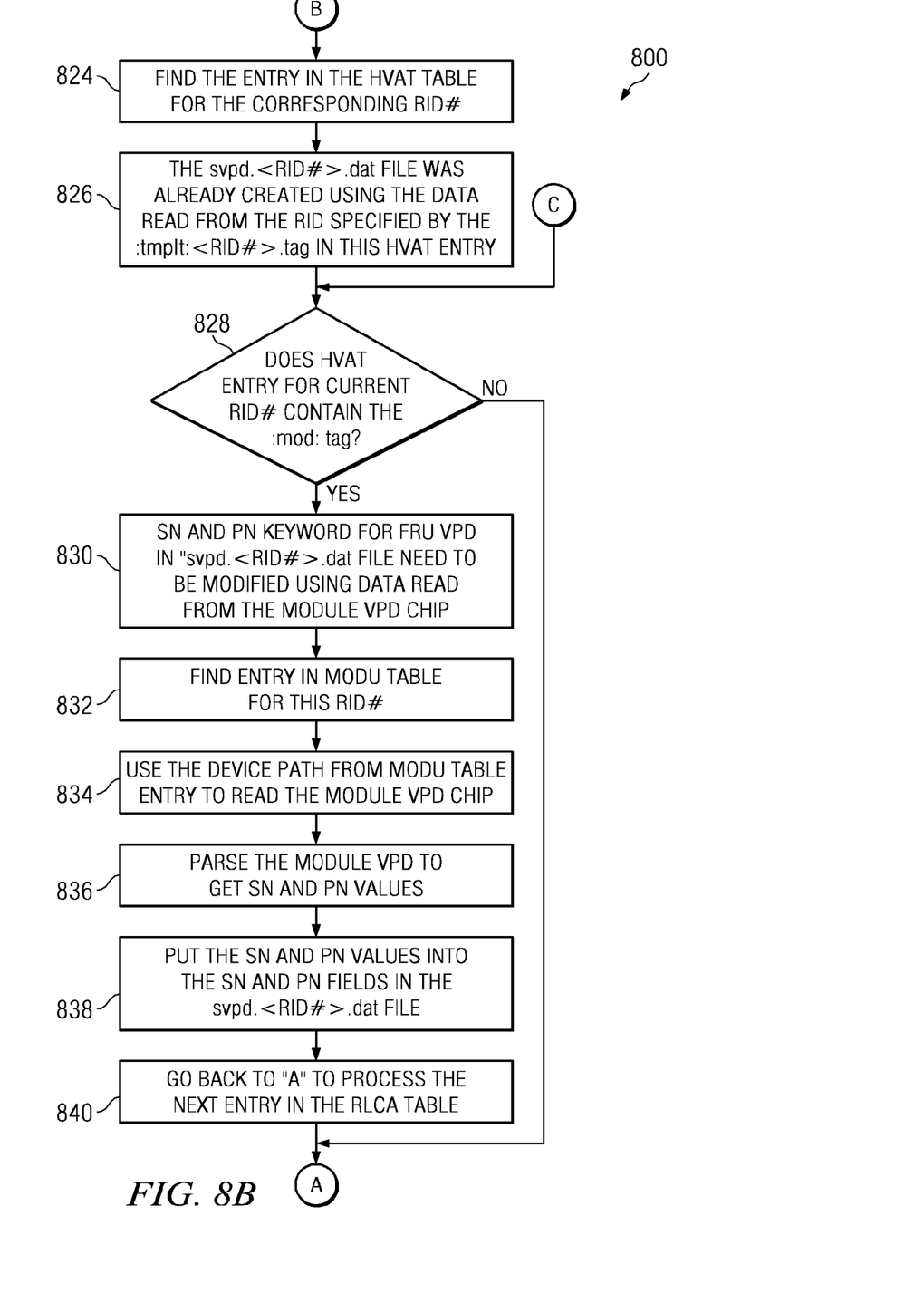

With reference to FIGS. 8A and 8B, are flowcharts of a process of vital product data management, in accordance with illustrative embodiments. Process 800 is an example of a data collection sequence as performed by vital product data manager 202 of FIG. 2.

Process 800 starts (step 802) and begins processing of an entry in the resource identification location code array (step 804). The resource identification location code array is the first control file to be processed. A determination is made whether there are more resource location code array entries to process (step 806). If there are more entries, a "yes" result is obtained. If the determination is there are no more entries, a "no" result is obtained. When a "no" result is obtained in step 806, process 800 terminates thereafter (step 810).

When a "yes" is obtained in step 806, the resource location code array entry is examined for a "u" tag to determine if this resource has a unique vital product data chip to be read (step 808). When a "u" tag is located in the resource location code array entry a "yes" result is obtained. When no "u" tag is found in the entry a "no" result is obtained. When a "no" result is obtained in step 808, process 800 skips ahead to step 822. When a "yes" result is obtained in step 808, the hardware vital product data address table is examined to find the entry corresponding to the resource identifier number of the entry in the resource location code array table (step 812). The device path of the entry in the hardware vital product data address is used as the resource identifier path setting to the information "smart-chip" (step 814). Having obtained the path information, use the path information obtained from the hardware vital product address table to read the field replaceable unit vital product data from the information secure data "smart-chip." Store the data read in the flexible service processor (FSP) file system for this resource identifier (RID#) into a data file names "svpd.<RID#>.dat (step 816).

A determination is made whether the hardware vital product data address table entry contains a ":copy:list of additional RID#'s" indicating use of a ":copy:" flag type (step 818). When a determination is made that a "copy:list" is found, a "yes" results. When no "copy:list" is found, a "no" results. When a "no" results in step 818, process 800 skips to step 822. When a "yes" results in step 818, data read, for each of the resource identifiers in the list of additional identifiers, from the hardware is stored in the flexible service processor file system files (step 820). A determination is then made as to whether the resource location code array entry contains a "t" tag (step 822). When a "t" tag is found a "yes" result is obtained (step 822). When there is no "t" tag, a "no" result is obtained. When a "no" result is obtained in step 822, process 800 skips to step 828.

When a "yes" result is obtained in step 822, a search is initiated to find the entry in the hardware vital product information address table for the corresponding resource identifier (step 824). The "svpd.<RID#>.dat" file for this resource has already been created using the data read from the RID specified by the ":tmplt:" tag, or flag type, in this hardware vital product data address table entry (step 826).

A determination is made whether the hardware vital product data address table entry for the current resource identifier contains a ":mod:" tag or flag type (step 828). When a ":mod:" tag is found, a "yes" result is obtained. When no ":mod:" tag is found, a "no" result is obtained. When a "no" result is obtained, process 800 loops back to step 806. When a "yes" is obtained in step 828, a serial number and part number keyword for the field replaceable unit vital product data in the "svpd.<RID#>.dat" file needs to be modified using the data read from the module vital product data chip, "smart-chip." (step 830).

A search is performed to find the entry in the MODU table for the resource identifier (step 832). Having found the entry, the device path from the MODU table entry is used to read the module vital product data chip information (step 834). An operation to parse the module vital product data is performed to get the serial number and part number values (step 836). The serial number and part number values are then written into the serial number and part number fields of the "svpd.<RID#>.dat" file (step 838). Process 800 loops back to step 806 to process as before (step 840).

An illustrative embodiment provides a capability to collect the vital product data from the various processor resources identified. The collected data more accurately depicts the processor information, including serial number and part number information, obtained from the system in a ready to use form. The data is then stored in data files and made accessible to other components processes or users.

In an illustrative embodiment, a system may have the vital product data access information moved from being embedded within hardware to a storage location in tables on a flexible service processor. These tables define various information including device paths to access field replaceable unit vital product data, module vital product data, light emitting diodes, as well as information for location codes, and presence detect. Using the data tables provides a capability to address the previously stated issues.

The flags, in the vital product data tables called hardware access tables, modu tables, and resource identifier location code arrays will instruct the vital product data firmware to collect the vital product data from one secure device first. After collecting the information from the hardware, a soft copy, in the form a data file, is created of the vital product data for all resource identifiers which are using the "smart-chip" secure device vital product data. Only the soft copies of the data are stored on the flexible service processor persistent cache and reported to the external users.

Using this methodology, the vital product data collected from one device for a four processor node or subsystem, is represented to indicate there are four processor resource identifiers in the node. On some example systems, this may be all that is required to associate the correct processor field replaceable unit vital product data with each of the processor resource identifiers. In another example system, in addition to making the copies of the processor field replaceable unit vital product data read from the secure device on the node, each of these copies is customized using data from the module vital product data to create unique field replaceable unit vital product data for each of the processor field replaceable unit resource identifiers on the node. The customization is performed by obtaining the part number and serial number for the field replaceable unit from the module vital product data and updating these values in the appropriate copy of the processor field replaceable unit vital product data read from the secure device. In a maximum configuration there are eight nodes, wherein each node has four processors. Therefore, the above mentioned process is repeated for each of the eight nodes.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for resource data management, the computer implemented method comprising:
    determining whether a resource entry in a resource location code array in a first data structure for a set of resources is unique in which the resource entry is a current resource;
    responsive to a determination that the current resource is unique, identifying a corresponding entry in hardware vital product data address information in a second data structure and obtaining a replaceable unit data for the current resource from the hardware vital product data address information;

storing a replaceable unit data for the current resource to form a current data file;

determining whether the corresponding entry contains a copy indicator;

responsive to a determination that the corresponding entry contains a copy indicator, copying the current data file into a set of data files by locating a template indicator in the resource entry in the resource location code array in the first data structure referring to the current resource and using the replaceable unit data as a template, wherein each data file represents a resource identified by the copy indicator;

determining whether the corresponding entry has a modify indicator; and responsive to a determination that the corresponding entry has a modify indicator, identifying a path to characterization data in a third data structure comprising path information for the location of the characterization data for the set of resources and updating each data file in the set of data files with a characterization data for a respective resource in the set of data files using the identified path to the to the characterization data.

2. The computer implemented method of claim 1, wherein the characterization data contains serial number and part number data.

3. A data processing system for resource data management, the data processing system comprising:

a bus;

a memory connected to the bus, wherein the memory comprises computer-executable instructions;

a communications adapter connected to the bus;

a display adapter connected to the bus;

a processor connected to the bus, wherein the processor executes the computer-executable instructions to direct the data processing system to:

determine whether a resource entry in a resource location code array in a first data structure for a set of resources is unique in which the entry is a current resource;

responsive to a determination that the current resource is unique, identify a corresponding entry in hardware vital product data address information in a second data structure and obtain a replaceable unit data for the current resource from the hardware vital product data address information;

store a replaceable unit data for the current resource to form a current data file;

determine whether the corresponding entry contains a copy indicator;

responsive to a determination that the corresponding entry contains a copy indicator, copy the current data file into a set of data files by locating a template indicator in the resource entry in the resource location code array in the first data structure referring to the current resource and using the replaceable unit data as a template, wherein each data file represents a resource identified by the copy indicator;

determine whether the corresponding entry has a modify indicator; and responsive to a determination that the corresponding entry has a modify indicator, identify a path to characterization data in a third data structure comprising path information for the location of the characterization data for the set of resources and update each data file in the set of data files with a characterization data for a respective resource in the set of data files using the identified path to the to the characterization data.

4. The data processing system of claim 3, wherein the characterization data contains serial number and part number data.

5. A computer program product for resource data management, the computer program product comprising a computer-readable, tangible storage device, tangibly embodying computer-executable instructions thereon, the computer-executable instructions comprising:

computer-executable instructions for determining whether a resource entry in a resource location code array in a first data structure for a set of resources is unique in which the entry is a current resource;

computer-executable instructions responsive to a determination that the current resource is unique, for identifying a corresponding entry in hardware vital product data address information in a second data structure and obtaining a replaceable unit data for the current resource from the hardware vital product data address information;

computer-executable instructions for storing a replaceable unit data for the current resource to form a current data file;

computer-executable instructions for determining whether the corresponding entry contains a copy indicator;

computer-executable instructions responsive to a determination that the corresponding entry contains a copy indicator, for copying the current data file into a set of data files by locating a template indicator in the resource entry in the resource location code array in the first data structure referring to the current resource and using the replaceable unit data as a template, wherein each data file represents a resource identified by the copy indicator;

computer-executable instructions for determining whether the corresponding entry has a modify indicator; and computer-executable instructions responsive to a determination that the corresponding entry has a modify indicator, for identifying a path to characterization data in a third data structure comprising path information for the location of the characterization data for the set of resources and updating each data file in the set of data files with a characterization data for a respective resource in the set of data files using the identified path to the to the characterization data.

6. The computer program product of claim 5, wherein computer-executable instructions for identifying the path to the characterization data comprises identifying a device containing the characterization data.

7. The computer program product of claim 5, wherein the characterization data contains serial number and part number data.

* * * * *